No. 865,260. PATENTED SEPT. 3, 1907.
A. P. S. MACQUISTEN.
APPARATUS FOR SEPARATING SOLID PARTICLES FROM EACH OTHER.
APPLICATION FILED NOV. 16, 1905.

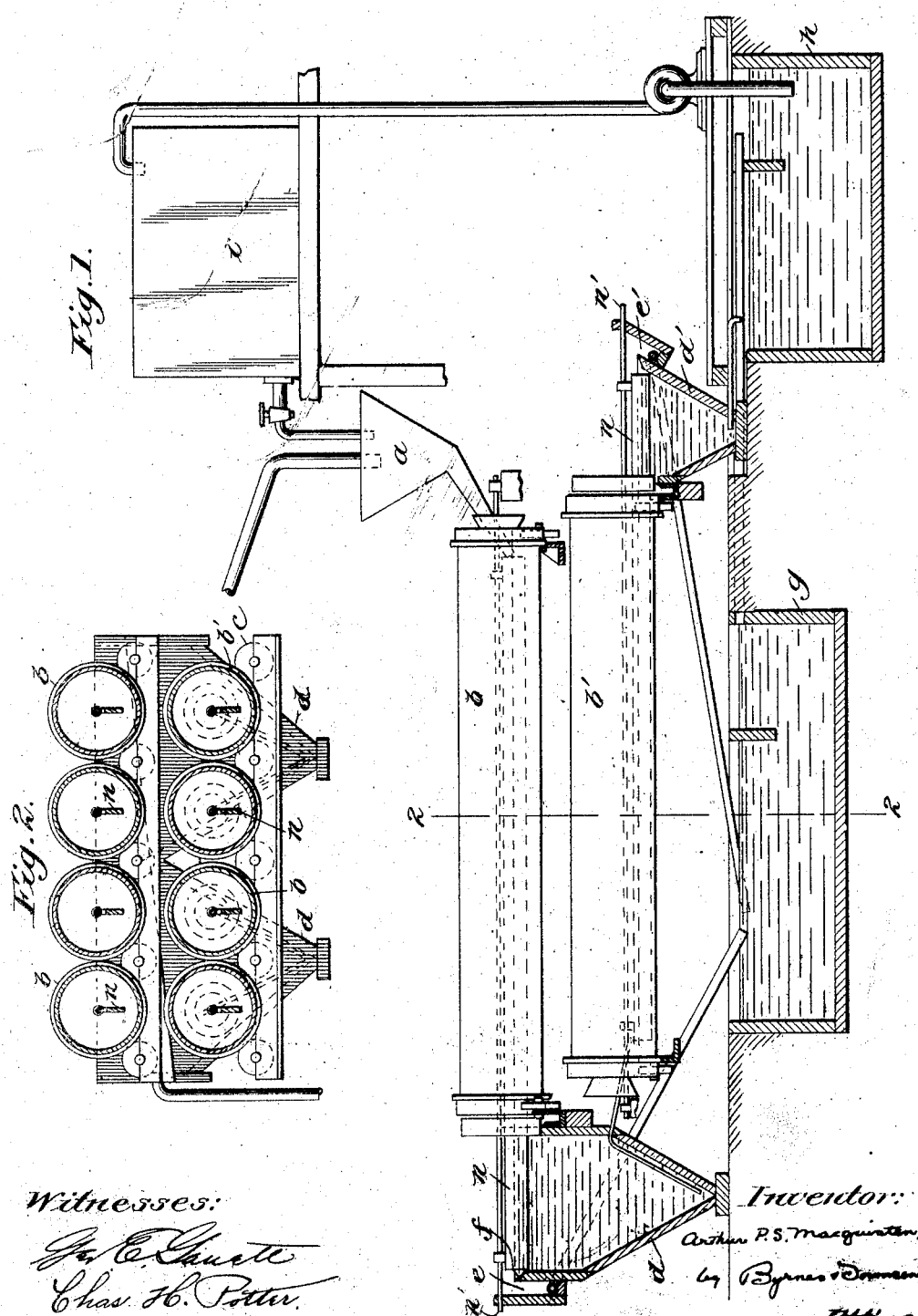

2 SHEETS—SHEET 2.

Witnesses:
Geo. E. Gauntt
Chas. H. Potter.

Inventor:
Arthur P. S. Macquisten,
by Byrnes & Townsend,
Attys.

UNITED STATES PATENT OFFICE.

ARTHUR PENRHYN STANLEY MACQUISTEN, OF GLASGOW, SCOTLAND.

APPARATUS FOR SEPARATING SOLID PARTICLES FROM EACH OTHER.

No. 865,260.          Specification of Letters Patent.          Patented Sept. 3, 1907.

Application filed November 16, 1905. Serial No. 287,720.

*To all whom it may concern:*

Be it known that I, ARTHUR PENRHYN STANLEY MACQUISTEN, a subject of the King of Great Britain, residing at 33 Renfield street, Glasgow, Scotland, N. B., chartered accountant, have invented a certain new and useful Improved Apparatus for Separating Solid Particles from Each Other, of which the following is a specification.

This invention relates to apparatus for separating solid particles from each other by methods such as described in my pending U. S. application Serial No. 268,276, filed July 3, 1905, which are based on the fact that some substances when conveyed to or through the surface of a liquid are more readily retained at or on that surface than other substances, and that consequently in a mixture of such substances those which are more readily retained at or on the surface can, on account of such property, be separated by flotation from those which are not.

Figure 5:
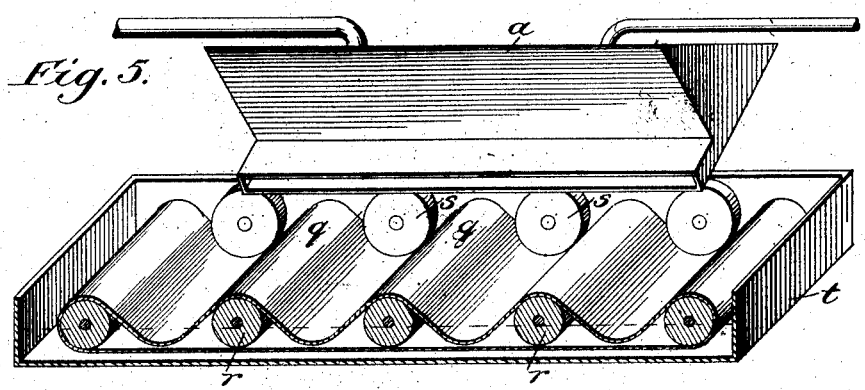
Figure 3:
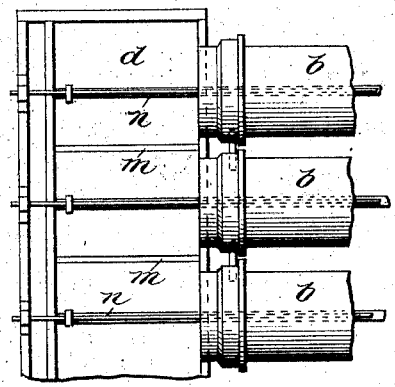
Figure 4:
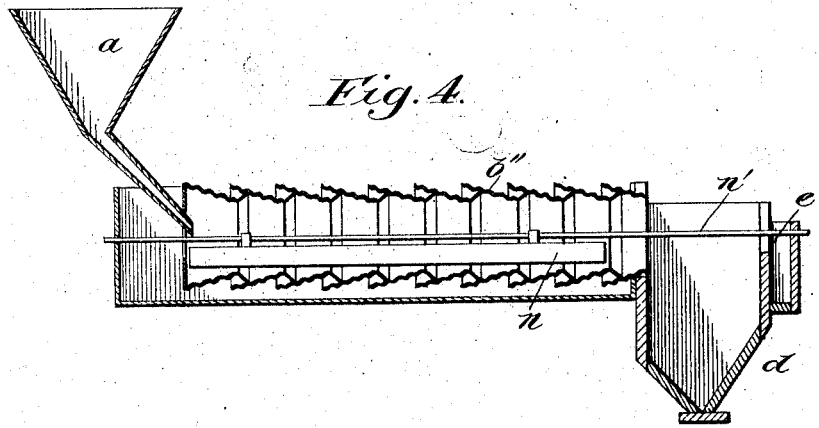

The preferred form of apparatus for practicing this method of separation is hereinafter described, and is illustrated in the accompanying drawings wherein:

Figure 1 is a longitudinal section, partly in elevation, showing the general arrangement of one form of apparatus; Fig. 2 is a transverse vertical section on line 2—2 of Fig. 1; Fig. 3 is a part plan view of the same; Fig. 4 is a longitudinal vertical section of a modified form of apparatus; and Fig. 5 is a perspective view of a portion of a further modification.

Referring to these drawings, it is to be understood as is more fully described in the specification above referred to that the mixture of particles of different characters, which we will assume to be a pulp of crushed metalliferous ore, is fed into a hopper $a$ by which it is introduced into the interior of a horizontal revolving cylinder $b$, or equivalent apparatus, which is partially filled with or revolves partially immersed in water or other suitable liquid.

The slow rotation by suitable means by the cylinder $b$, the axis of which may be slightly inclined to the horizontal on the supporting rollers $c$ brings the particles borne thereon to or through the surface of the liquid alternately in an emerging and a submerging direction and the separation of the metalliferous particles from the gangue is effected on such emergence or submergence by the selective capillary action of the liquid surface, the metalliferous particles being borne away on the surface of the liquid stream while the gangue particles sink to the bottom. As the particles emerge above the surface of the liquid, owing to the steep angle at which they are carried which is greater than the angle of repose of the mass, they roll back upon and over the ascending mass, so that fresh metalliferous particles are repeatedly exposed to the action of the surface of the liquid and are caused to float, this operation being effected very often and so gently that a very thorough separation takes place. The repeated subjection of the mixture by the conveyer to the capillary action of the liquid surface effects the practically complete separation of the two classes of particles, the metalliferous particles being carried by the stream on the surface of the liquid through the tank $d$, and over its edge $f$ into a launder $e$ whence it passes to a subsiding tank $g$ from which the overflow liquid passes to another tank $h$ and is thence pumped to an elevated storage tank $i$ for future use. The other particles subside in the tank $d$ from which they may be transferred to a second separating apparatus $b'$ at a lower level in which the separating process is repeated and the separated metalliferous particles are borne over the edge of the vessel $d'$ into the launder $e'$ and thence to the subsiding tank $g$, the contents of the vessel $d'$ passing into the tank $h$.

In order to prevent transverse surface currents produced by the rotation of the drum $b$, whereby particles which are separated from the gangue on submergence are transferred to the opposite wall and again picked up by the liquid thereon and carried round with the drum, the separating process being thus needlessly performed several times over, a longitudinal baffle $n$ is provided extending from the charging end of the drum to the edge $f$ of the vessel $d$, this baffle dipping in the liquid a sufficient depth to prevent transverse currents and being suitably supported, preferably in the medial plane of the drum, as by means of a fixed axial rod $n'$ carried by the frame of the apparatus.

When a number of drums $b$ discharge into one vessel $d$, as shown in the drawings, longitudinally circulating surface currents are created in the liquid, and to obviate these, surface partitions or baffles $m$ are provided extending across the vessel $d$ between adjacent cylinders $b$. The ends of these baffles as also the ends of baffles $n$ may be made liquid tight by connecting them by strips of indiarubber with the walls of the vessel $d$.

It is obvious that instead of a drum several diameters in length, a series of shorter vessels arranged tandem fashion and suitably connected by troughs or launders or spiral conveyers may be substituted. Or the conveyer device may be rotated in a fixed liquid containing vessel; and may consist of interlapping cones $b''$, as shown in Fig. 4.

Another type of conveyer is indicated in Fig. 5 in which a traveling band $q$ is constrained by guide pulleys $r$, $s$, to pass repeatedly into and out of the body of liquid contained in a fixed vessel $t$. In this case the liquid stream would be directed transversely to the travel of the belt so that the separated metalliferous particles may be transported clear of the conveyer as speedily as possible. The advantage of conveying or separating devices the walls of which are not continuous, is that the separated metalliferous particles may in these cases be floated clear of the rotating conveyer more quickly.

It is to be noted that in many cases the conveying or separating devices above referred to may be oscillated instead of being rotated, or they may be modified so as to make them suitable for an oscillatory movement. These various conveying or separating devices are merely described as some of the many possible forms which this apparatus may take, the only essential condition being that the apparatus should be of a character adapted to take up and support the ore pulp or other mixed particles and convey them to or through the surface of the liquid repeatedly during their passage through the separating vessel.

To assist the removal of the separated mineral particles from the neighborhood of the conveyer, a series of air jets may be used to direct streams of air along the surface of the liquid in the direction in which the particles are required to be transported.

Having now described the nature of my said invention and the best means I know of carrying the same into practical effect, I claim:—

1. Means for separating a mixture of finely-divided particles of ore, comprising a support for said particles arranged to move in contact with a body of liquid, said support passing through the surface of the liquid in such direction as to carry the particles therethrough and to cause them to roll back to the surface of the liquid.

2. Means for separating a mixture of finely divided particles of ore, comprising a support for said particles arranged to rotate in contact with a body of liquid, said support passing through the surface of the liquid in such direction as to carry the particles therethrough and to cause them to roll back to the surface of the liquid.

3. Means for separating a mixture of finely divided particles of ore, comprising a cylinder arranged to rotate in contact with a body of liquid, said cylinder passing through the surface of the liquid in such direction as to carry the particles therethrough and to cause them to roll back to the surface of the liquid.

4. Means for separating a mixture of finely-divided particles of ore, comprising a cylinder arranged to rotate in contact with a body of liquid, said cylinder passing through the surface of the liquid in such direction as to carry the particles therethrough and to cause them to roll back to the surface of the liquid, and a baffle longitudinally disposed in said cylinder for preventing transverse liquid currents therein.

In testimony whereof I have signed my name to this specification in the presence of two subscribing witnesses.

ARTHUR PENRHYN STANLEY MACQUISTEN.

Witnesses:
WILLIAM PIRIE,
JAMES ALLAN KENNETH.